United States Patent
Hamelbeck

[11] Patent Number: 6,120,170
[45] Date of Patent: Sep. 19, 2000

[54] MOUNTING DEVICE FOR A VEHICLE LAMP

[75] Inventor: Antonius Hamelbeck, Anroechte, Germany

[73] Assignee: Hella KG Hueck & Co., Lippstadt, Germany

[21] Appl. No.: 09/027,487

[22] Filed: Feb. 20, 1998

[30] Foreign Application Priority Data

Feb. 24, 1997 [DE] Germany .......................... 197 07 094

[51] Int. Cl.[7] .................................................. B60Q 1/04
[52] U.S. Cl. .......................... 362/549; 362/507; 362/368
[58] Field of Search .................................. 362/497, 510,
362/365, 150, 382, 546–549, 507, 476,
368; 248/27.3, 304, 307, 503, 560, 561,
580, 603, 634, 635

[56] References Cited

U.S. PATENT DOCUMENTS

| | | | |
|---|---|---|---|
| 4,394,054 | 7/1983 | Nieboer | 321/7.2 |
| 4,488,206 | 12/1984 | Mizusawa | 362/226 |
| 4,541,036 | 9/1985 | Laundries et al. | 361/426 |
| 4,716,504 | 12/1987 | Pahl et al. | 362/150 |
| 4,722,032 | 1/1988 | Kulka . | |
| 4,812,133 | 3/1989 | Fleak et al. | 439/248 |
| 5,180,219 | 1/1993 | Geddie | 362/61 |
| 5,465,928 | 11/1995 | Massie | 248/27.1 |

FOREIGN PATENT DOCUMENTS

| | | |
|---|---|---|
| 7407139 | 7/1974 | Germany . |
| 29 39 595A1 | 4/1981 | Germany . |
| 91 06 509 U | 5/1991 | Germany . |

Primary Examiner—Sandra O'Shea
Assistant Examiner—Ismael Negron
Attorney, Agent, or Firm—Griffin, Butler, Whisenhunt & Szipl, LLP

[57] ABSTRACT

An auto rear lamp has at least one mounting lug (1) formed on a back thereof that can be inserted into a mounting hole (3) for locking the rear lamp to an edge area (5) defining the mounting hole via a spring mounted locking element (2) on the mounting lug. The spring mounted locking element is pivotal about an elastically flexible area in a pivot line extending in a insertion direction (6). The mounting lug can be inserted into the mounting hole until a first edge (17) of the spring mounted locking element, which extends at least to the pivot line engages behind the edge area defining the mounting hole and a bearing surface (7, 8) of the lamp fits closely to the vehicle.

18 Claims, 6 Drawing Sheets

6,120,170

MOUNTING DEVICE FOR A VEHICLE LAMP

BACKGROUND OF THE INVENTION

This invention relates to a mounting device for a vehicle lamp, particularly a taillight having at least one mounting lug attached to a back of the lamp that has a locking piece at its free end, by means of which the mounting lug can be inserted into a mounting hole of a vehicle and can be fastened in a self-locking manner to an edge area defining the mounting hole, while at least one bearing surface of the lamp, directed in an insertion direction of the mounting lug, is brought to bear against the vehicle.

German Gebrauchsmuster (registered utility model) 74 07 139 discloses such a mounting device for a vehicle lamp wherein the lamp has a plastic housing, its back forming a saucer-shaped reflector and its front being covered by a light-transmissive cover plate. At an apex, the reflector has an opening for receiving a bulb. The lamp is placed into a vehicle opening and, via a gasket spring element that surrounds the vehicle opening, bears against an edge area of the vehicle opening. Each mounting lug of the lamp has a lock-in nose at a free end thereof, and is flexible along nearly its entire length. The locking lugs are inserted into mounting holes of the vehicle and their lock-in noses engage in a self-latching manner behind the edge area of the mounting hole. The spring element, that is the surrounding gasket, is thereby compressed. The spring mounted locking lugs are pivotal about lines of elastic area extending perpendicular to their direction of insertion, and their lock-in noses are biased to press against the edge area defining the mounting hole of the vehicle. Because of this continuous elastic force, the elasticity of the mounting lugs decreases over time, and the locking connection between the mounting holes of the vehicle and the mounting lugs can grow loose on its own during vehicle operation. The locking connection can also become loosened when a bulb is changed.

It is an object of this invention to provide a mounting device for a vehicle lamp of the type described in the opening paragraph, wherein a self-locking connection between a mounting lug of a lamp and a vehicle is protected against loosening on its own, even when significant force is applied opposite an insertion direction of the mounting lug, which can occur when the bulb is changed, and wherein the mounting lug must not be prestressed to press against an edge area defining the mounting hole, crosswise with respect to its direction of insertion, for holding the lamp on the vehicle.

SUMMARY

According to principles of the invention a springmounted locking piece is molded onto a rigid end section of a mounting lug that can be inserted through a mounting hole of a vehicle, with the locking piece being movable at an elastically flexible area at least about a line running in an insertion direction of the mounting lug. In this way, the spring mounted locking piece is subject to prestressing as it is fitted against an edge area of the mounting hole only during insertion through the mounting hole of the vehicle.

BRIEF DESCRIPTION OF THE DRAWING

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
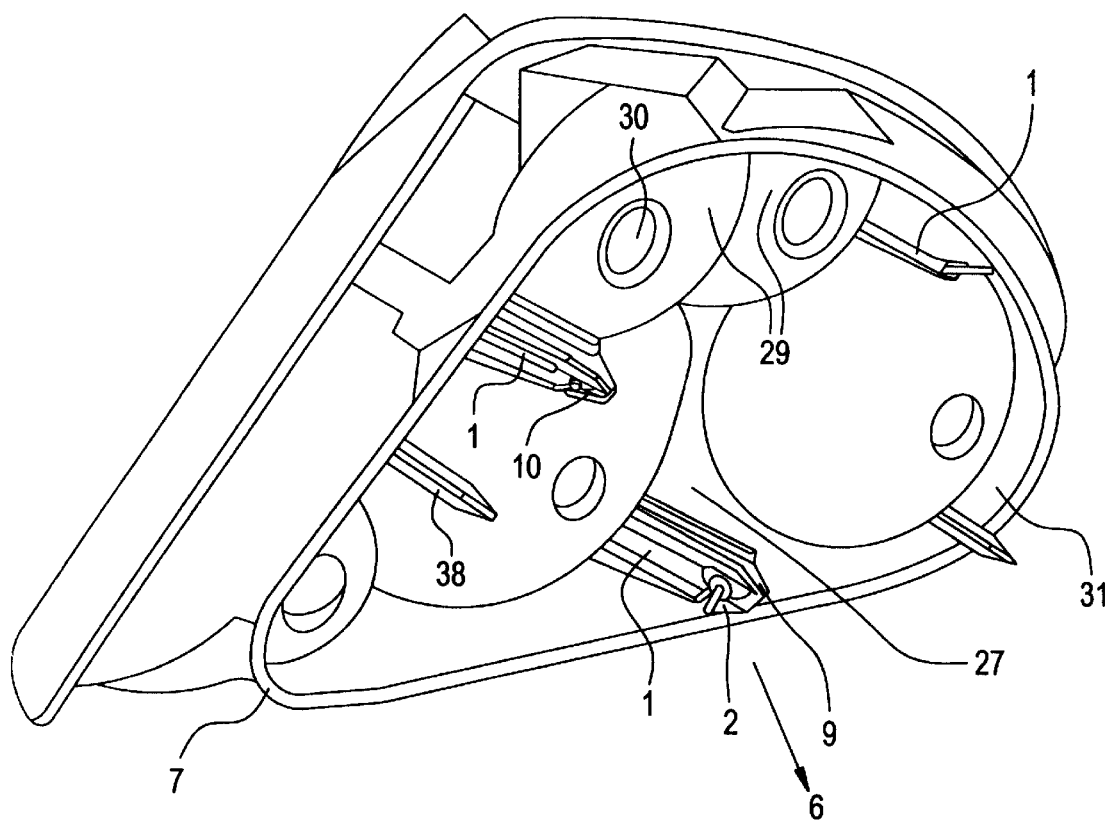
FIG. 1 is a perspective view of the back of a vehicle lamp with mounting lugs that can be connected to a vehicle in a self-locking manner.
Figure 2:
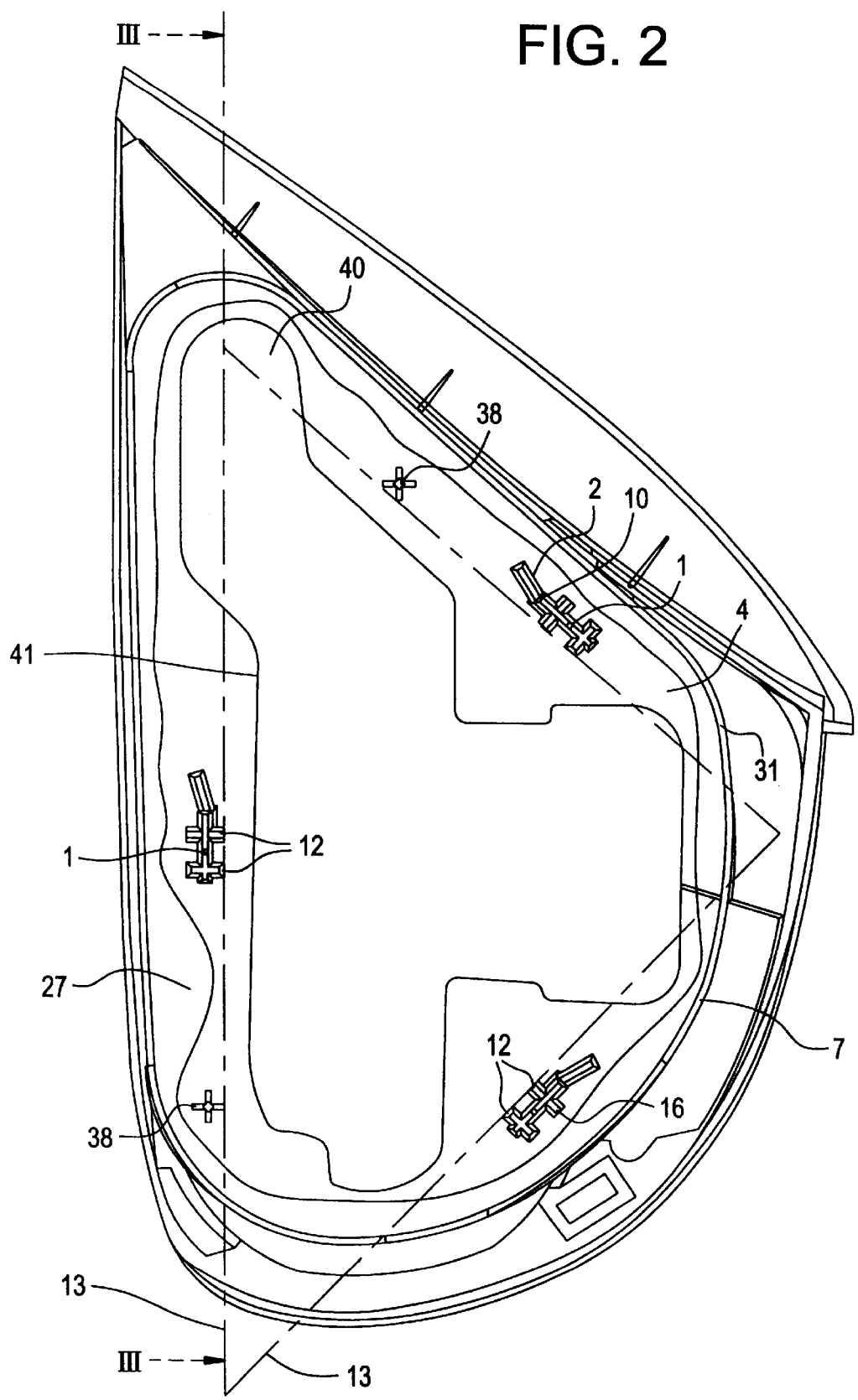
FIG. 2 is a simplified plan back view of the lamp of FIG. 1.
Figure 3:
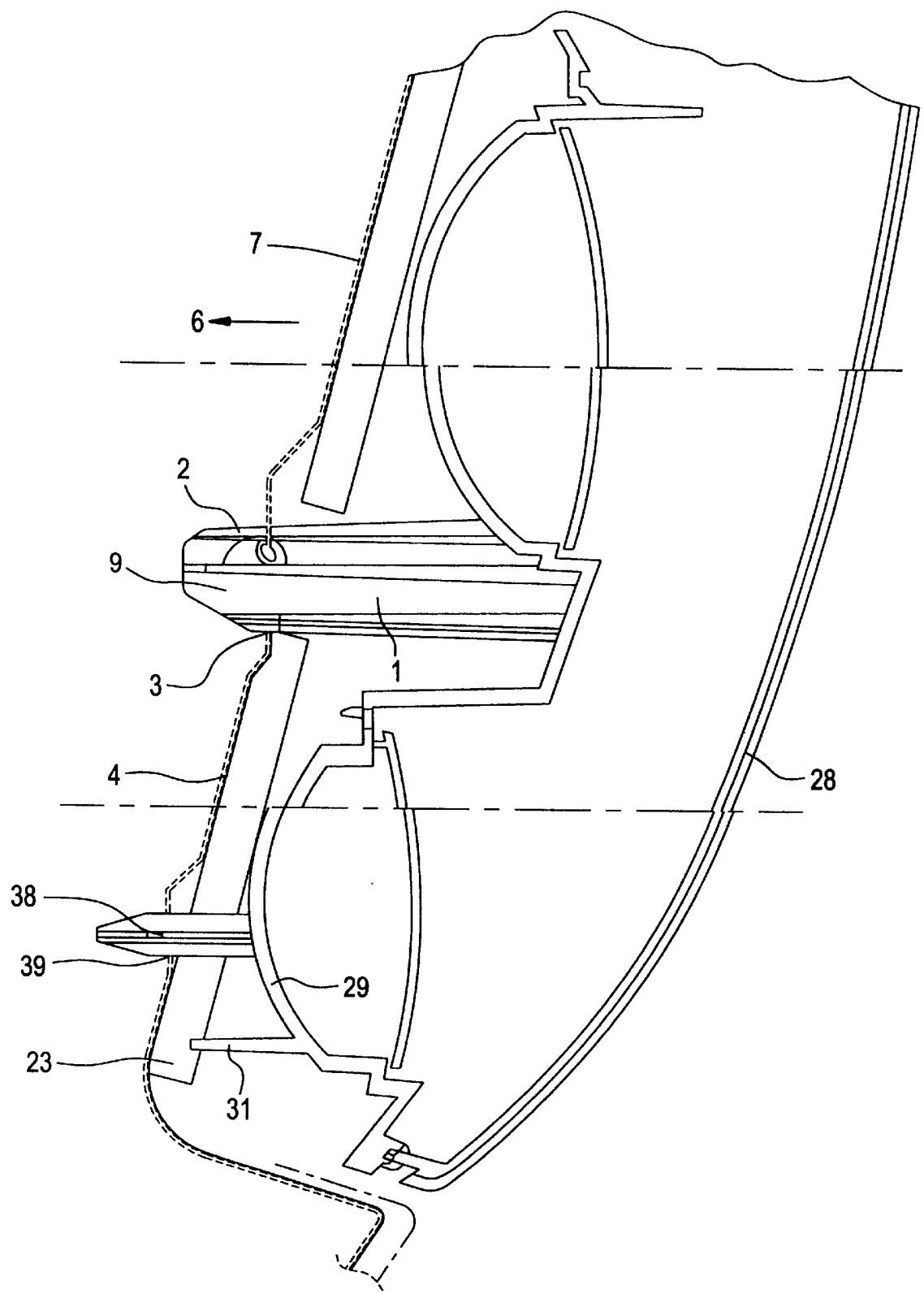
FIG. 3 is a section through the lamp of FIG. 2 taken on line III—III in FIG. 2.

FIGS. 1, 2 and 3 show a vehicle taillight lamp having a plastic housing 27, a front of which is tightly sealed by a light-transmissive cover plate 28. A back of the housing 27 itself forms several reflectors 29 that have several openings 30 at apexes for receiving bulbs (not shown). The reflectors are surrounded by a collar 31 formed on the back of the lamp which defines a bearing surface 7. The bearing surface 7 of the collar 31 fits, in an in-line arrangement with a spring element 23, which is a gasket, against a continuous edge 41 of an opening in a vehicle 4. A bulb of the lamp held by a lamp holder 40 can be changed through the opening in the vehicle 4.

At the back of the housing 27, three arm-shaped mounting lugs 1 are formed inside the continuous collar to extend out beyond the collar 31. The arm-shaped mounting lugs 1 are formed as edgewise walls running in planes 13 that intersect and form a triangular cylinder. The planes 13 run near a peripheral edge of the lamp and a geometrical center of the lamp is 17 the triangular cylinder. Each mounting lug 1, including a free rigid end section 9 thereof, is rigid, and the rigid end section 9 can be shoved through a mounting hole 3 of a vehicle 4. A spring mounted locking element 2 is formed on a side edge of the rigid end section 9, which is movable about a pivot line 10 running in an insertion direction 6 of the mounting lug 1, in an elastically flexible area. The locking element 2 can also be movable about several pivot lines 10 that are formed by elastic sections of the mounting lug. The main extension of the locking element 2 extends at a sharp angle a with respect to a main lateral extension of the rigid end section 9 of the mounting lug 1. The locking element 2 has a first edge section 17 facing opposite the insertion direction 6 and extending at a right angle to the insertion direction 6, which engages behind a first edge area 5 defining the mounting hole 3 in a self-locking manner. The locking element 2 is triangular in its spring movement direction 11, whereby sides of the triangle are formed by the line 10, the first edge section 17, and a second edge section 18. The second edge section 18 and a slanted fourth edge section 32 of the rigid end section 9 taper the mounting lug 1 toward its free end. The second and third edge sections 18, 32 serve as wedge members, so that the mounting lug 1 can easily be threaded into the mounting hole 3 of the vehicle 4. The first edge section 17 of the spring mounted locking element 2 and a third edge section 22 of the mounting lug 1 border a slot 19 made in the mounting lug 1, into which the first edge area 5 defining the mounting hole 3 engages when the mounting lug 1 is locked in position. An eye-shaped opening 20 is provided in the mounting lug 1, which opens into the slot 19. The mounting hole 3 of the vehicle 4 is rectangular and, on a side opposite the first edge area 5, has a second edge area 14 along which two support surfaces 12 of the mounting lug 1, in the mounting lug's locked-in position, extend. The support surfaces 12 are formed by stiffening ribs 16 that extend longitudinally in the insertion direction 6 of the mounting lug 1. When the mounting lug 1 is inserted into the mounting hole 3 of the vehicle 4, the support surfaces 12 of the mounting lug 1 slide along the second edge area 14 of the mounting hole 3. Thus the second edge section 18 of the locking element 2 also glides along the first edge area 5 of the mounting hole 3, and the locking element 2 is pressed through the mounting hole 3 until the locking element 2 springs out toward the outside and engages behind the first edge area 5 of the mounting hole 3 in a self-locking manner. In this position, the first edge area 5 of the mounting hole 3 is held in the slot 19 of the mounting lug 1, against movement in the insertion direction 6. The stiffening ribs 16 having the support surfaces 12, which extend out to the free end of the mounting lug 1, engage in a broader area 26 of the mounting hole 3, and their opposite sides are adjacent to third and fourth edge areas 33, 34 of the mounting hole 3. Thus the mounting lug 1 can be fixed in position in the mounting hole 3 at right angles to the spring movement direction 11 and the insertion direction 6. An narrower area 25 of the mounting hole 3 adjacent the broader area 26, through which the locking element 2 is to be fed, is narrower than the broader area 26. The side of the mounting lug 1 facing away from the support surfaces 12 is adjacent to the first edge area 5 of the mounting hole 3. The rigid end section 9 has an undercut 24 formed by a hole made in the rigid end section 9. Thus, by means of a tool (not shown) that engages in the undercut 24, the mounting lug 1 can be drawn with great force that counteracts a resisting force of the spring element 23 far enough in the insertion direction 6 that lug 1 engages behind the edge area 5 defining the mounting hole 3 in a self-locking manner. The mounting lugs 1 and mounting holes 3 of the vehicle 4 described above are illustrated in FIGS. 4 through 6.

Figure 4A:
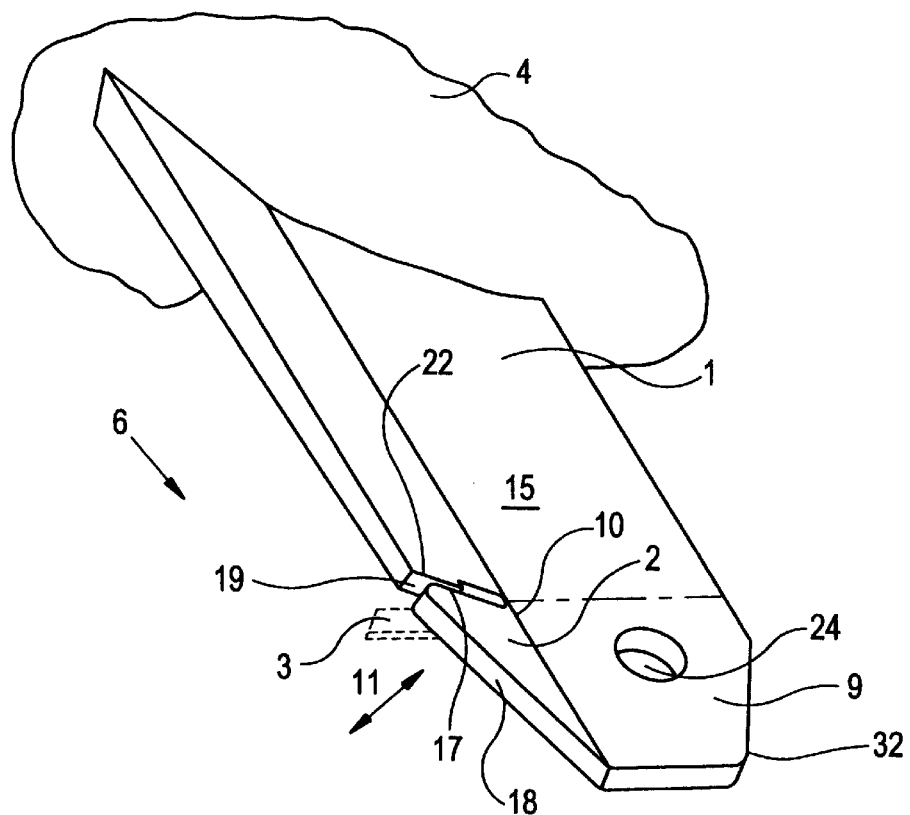
FIG. 4 is an exploded perspective view of a first embodiment of a mounting lug of the lamp of FIG. 1, along with an edge area of a vehicle, before and after insertion of the mounting lug into a mounting hole defined by the edge area of the vehicle.
Figure 4B:
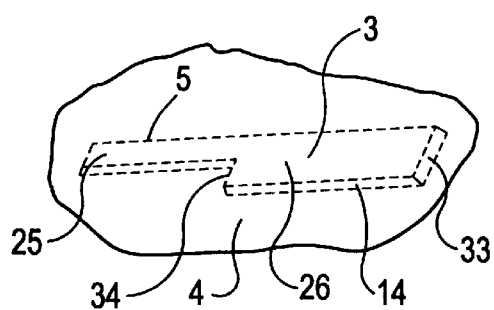
Figure 5:
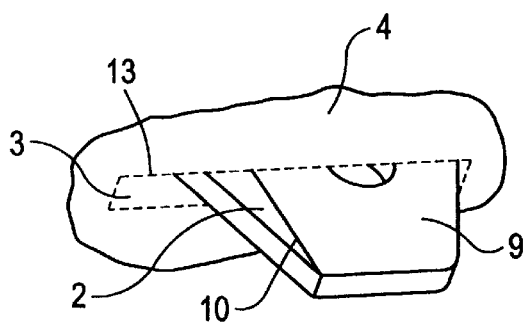
FIG. 5 is a perspective view of the mounting lug as in FIG. 4, along with an edge area of the vehicle, during insertion of the mounting lug into the mounting hole defined by the edge area of the vehicle.
Figure 6:
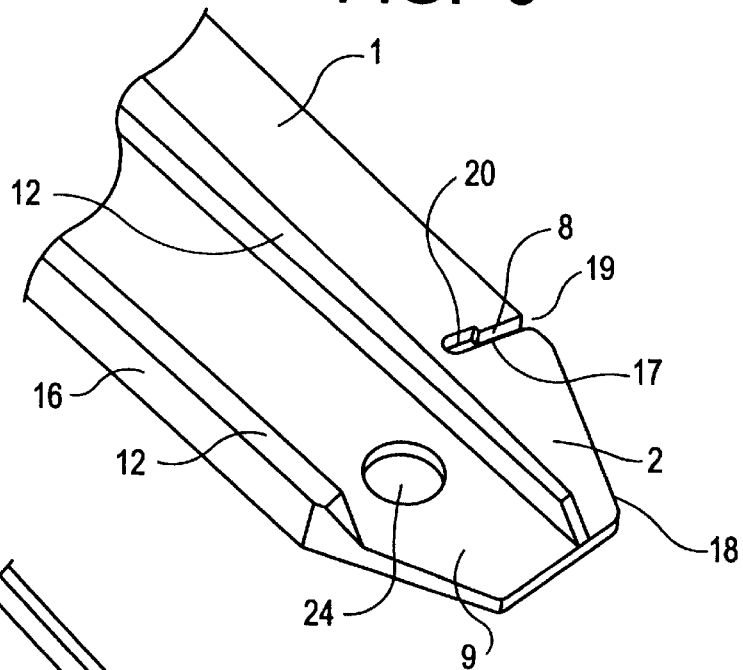
FIG. 6 is a perspective back view of the mounting lug as in FIGS. 4 and 5.
Figure 7:
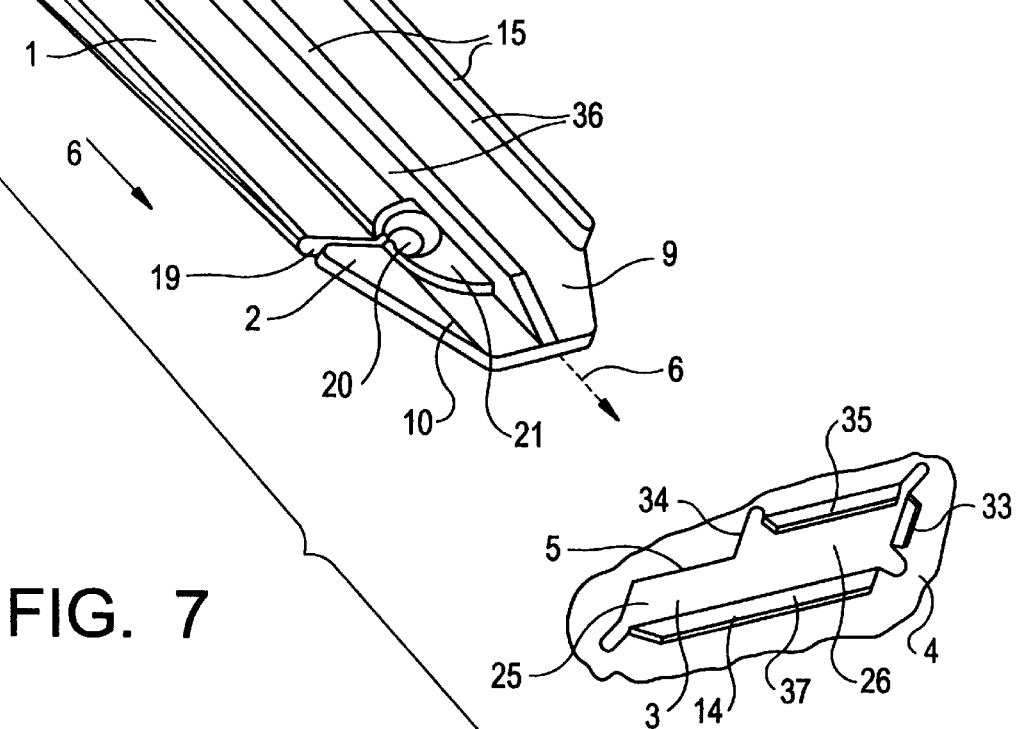
FIG. 7 is an exploded perspective back view of a second embodiment mounting lug of a lamp of this invention, along with an edge area of a vehicle, before insertion of the mounting lug into a mounting hole defined by the edge area of the vehicle.
Figure 8:
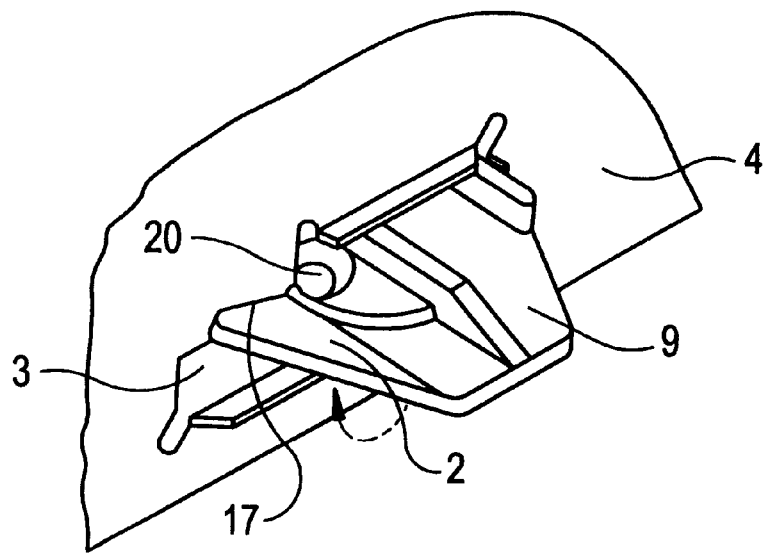
FIG. 8 is a perspective view of the mounting lug as in FIG. 7 in engagement with an edge area defining mounting hole of the vehicle in a self-locking manner.
Figure 9:
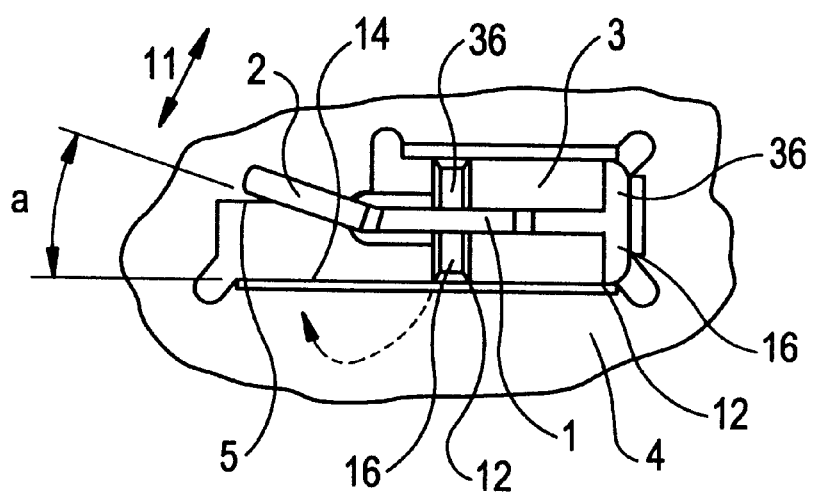
FIG. 9 is segmented end view, seen opposite an insertion direction of the mounting lug, of the mounting lug engaging an edge area defining the mounting hole of the vehicle in a self-locking manner.

The mounting lug 1 and the mounting hole 3 of the embodiment illustrated in FIGS. 7 through 9 exhibit the following differences with respect to the mounting lug 1 and the mounting hole 3 shown in FIGS. 4 through 6. An eyeshaped opening 20 is round and located in a rigid part of a mounting lug 1. The eye-shaped opening 20 is surrounded by a section 21 at which a wall thickness of the mounting lug 1 is greater. Support surfaces 15 of the mounting lug 1 that face away from a second edge area 14 of a mounting hole 3 are adjacent to a fifth edge area 35 of the mounting hole 3. Front edges of stiffening ribs 36 that extend in the insertion direction 6 serve as support surfaces 15. The narrow area 25 of the mounting hole 3 is formed by a section of the vehicle that extends inward and has the first edge area 5 behind which the locking element 2 engages in a self-locking manner. Second, third, and fifth edge areas 14, 33, 35 have edges 37 angled back in the insertion direction 6.

Two finger-like retaining lugs 38 pointing in the insertion direction 6 and tapering conically toward their free ends are formed on the back of the lamp. The retaining lugs 38 engage in retaining holes 39 of the vehicle 4, and are radially fixed in position in the retaining holes 39 with respect to the insertion direction 6. The retaining lugs 38 fit only partially to the edge of the retaining holes 39 of the vehicle 4, so that they can be inserted into the retaining holes with little force. In addition, the retaining lugs 38 can be made long enough that they hold the lamp firmly against the vehicle 4 before the mounting lugs 1 engage in the mounting holes 3 of the vehicle 4. For a large lamp, more than two retaining lugs 38 may also be provided for absorbing part of the significant vertical forces that occur during vehicle operation.

When the spring mounted locking element is continuously subject to prestressed engagement with the edge area defining the mounting hole of the vehicle as in the prior art, the elastic force decreases over time, particularly if the mounting lug is made of plastic. However, the locking element of this invention can be engaged against the edge area of the mounting hole of the vehicle with great force opposite the insertion direction, but without being continuously biased, because the spring mounted locking element is movable about the line running in the insertion direction.

The mounting lug can withstand a significant retention force necessary for holding the lamp securely in position if the lug and its rigid end section that can be inserted through the mounting hole of the vehicle are rigid.

The mounting lug can be securely engaged in the mounting hole of the vehicle, even when tolerances between the lamp and vehicle are large, by having at least one support surface of the mounting lug directed in the spring movement direction of the locking element, which slides on the second edge area of the mounting hole, opposite the first edge area, until the locking element engages in a self-locking manner behind the first edge area of the mounting hole. Thus the self-locking connection between the mounting lug and the vehicle can be loosened only if the locking element is urged to rotate about the line running in the insertion direction in the elastic area, until the locking element can be drawn through the mounting hole. The mounting lug can be fixed particularly securely in position in its direction of insertion in the mounting hole of the vehicle if it has at least one support surface in the spring movement direction on each of opposing sides.

The design of the mounting lug is particularly stable by having at least one support surface being formed by a front edge of a stiffening rib extending in the insertion direction of the mounting lug. The mounting lug can easily be threaded into the mounting hole and the locking connection can be established with little insertion force if the spring mounted locking element is formed by a wall section that has the second edge section directed in the insertion direction and the first edge section directed in the direction opposite insertion, with the first edge section engaging behind the edge area defining the mounting hole in a self-locking manner, and the second edge section serving as a leading diagonal edge member; during insertion of the mounting lug, the locking element gliding along a first edge area of the mounting hole until the locking element engages in a self-locking manner behind the first edge area of the mounting hole. It is advantageous that the lateral extension of the locking element runs at a sharp angle with respect to the main support surface of the mounting lug.

The lamp is fixed in position on the vehicle in the insertion direction of the mounting lug when the edge section of the locking element directed opposite the insertion direction borders the slot in the mounting lug extending crosswise to the insertion direction. The edge area of the mounting hole, behind which the locking element snaps, into position engages in this slot.

The spring mounted locking element can apply a greater force opposite the insertion direction on the edge area of the mounting hole of the vehicle, without the locking element being broken from the free rigid end section of the mounting lug owing to high stress concentration, by providing the eye-shaped opening in the mounting lug, which is adjacent the spring mounted locking element and opens into the slot. Furthermore, it is advantageous for the wall thickness of the mounting lug to be greater at the section around the eye-shaped opening.

The lamp is held in position on the vehicle in the insertion direction of the mounting lug, without rattling, if the bearing surface that bears on the vehicle includes a spring element attached to the back of the lamp, which presses the first edge section of the locking element, directed opposite the insertion direction, against the first edge area of the mounting hole behind which the locking element engages in a self-locking manner. As disclosed above, the spring element may be a gasket that fits tightly on an edge area of a vehicle opening, through which the bulb of the lamp can be changed.

The lamp can be moved with great force in the insertion direction, against the force of the spring element, if at least one undercut is provided in the rigid end section of the mounting lug for being passed through the mounting hole and engaged by a tool with which the mounting lug can be pulled into an end position, against the elastic force of the spring element, where it is securely engaged at the mounting hole. These lamp can also be held securely in position on the vehicle even when great vertical forces are generated during vehicle operation if several mounting lugs are formed on the back of the lamp, the support surfaces of at least two of which lie in intersecting planes.

In a further advantageous embellishment of the invention, at least two of the spring mounted locking elements are formed on the rigid end section of the mounting lug that can be inserted through the mounting hole of the vehicle. These spring mounted locking elements should be positioned symmetrical to a center plane extending in the insertion direction so that a moment of torsion that occurs on each is essentially counterbalanced by a moment of torsion on the other as a result of forces acting on the locking elements in the insertion direction; the mounting lug is thus subject only to forces running in the insertion direction.

The invention claimed is:

1. A mounting device for a vehicle lamp having:
    a portion of a vehicle defining a mounting hole having first and second edge areas, said second edge area being opposite said first edge area;
    at least one mounting lug (1) with a locking element (2) at its free end, the mounting lug (1) being located on a back of the lamp, said mounting lug (1) for being inserted into the mounting hole (3) of the vehicle (4) and fastened to the first edge area (5) of the mounting hole (3) in a self-locking manner;
    said mounting device including at least one bearing-surface element for forming a first spring bearing surface (7, 23) of the lamp directed in an insertion direction (6) of the mounting lug (1) through the mounting hole (3) for being set against the vehicle (4) when the mounting lug is inserted into the mounting hole;
    wherein the locking element (2) is formed on an end section (9) of the mounting lug (1) for being inserted through the mounting hole (3) of the vehicle (4) and for being spring mounted to move in an elastically flexible range relative to the rest of the lug at least about a pivot line (10) extending in the insertion direction (6);
    wherein said locking element (2) has a first edge (17) extending to the pivot line (10) for engaging in a self-locking manner behind said first edge area (5) of the mounting hole (3) once the mounting lug is inserted into the mounting hole;
    and wherein the mounting lug (1) has at least one support surface (12) directed in a spring movement direction (11) of the locking element (2), with which the mounting lug (1) slides along the second edge area (14) of the mounting hole (3) opposite the first edge area (5) until the locking element engages in the self-locking manner with the first edge area (5) of the mounting hole (3).

2. Mounting device as in claim 1, wherein the mounting lug (1) and its end section (9) for being inserted through the mounting hole (3) of the vehicle (4) are rigid.

3. Mounting device as in claim 1 wherein a main extension of the locking element (2) extends at a sharp angle (a) to a support surface (12) of the mounting lug (1).

4. Mounting device as in claim 1, wherein the mounting lug (1), has at least one support surface (12, 15) facing in a spring direction (11) of the locking element (2) on each of its opposite sides.

5. Mounting device as in claim 1 wherein the at least one support surface (12, 15) is formed by an edge face of a stiffening rib (16) extending in the insertion direction (6) of the mounting lug (1).

6. Mounting device as in claim 1 wherein the spring mounted locking element (2) is formed by a wall section that has second and first edges (18,17) respectively directed in the insertion direction (6) and opposite to the insertion direction, the first edge (17) of which, which is directed opposite to the insertion direction (6), for engaging in the self-locking manner behind the first edge area (5) forming the mounting hole (3) and the second edge (18) of which, which is directed in the insertion direction (6), for serving as a leading diagonal member with which the locking element (2) glides along the first edge area (5) of the mounting hole (3) while the mounting lug (1) is being inserted, until the locking element (2) engages in the self-locking manner behind the first edge area (5) of the mounting hole (3).

7. Mounting device as in claim 1, wherein the first edge (17) of the locking element (2), directed opposite the insertion direction (6), borders a slot (19) provided in the mounting lug (1), which runs crosswise to the insertion direction (6) and to the pivot line.

8. Mounting device as in claim 7, wherein an eye-shaped opening (20) is provided in the mounting lug (1), adjacent to the spring mounted locking element (2) which opens into the slot (19).

9. Mounting device as in claim 8, wherein a wall thickness of the mounting lug (1) is greater at a section (21) at the eye-shaped opening (20).

10. Mounting device as in claim 7, wherein the bearing surface of the lamp that bears against the vehicle (4) is formed by a third edge (22) of the slot (19), directed in the insertion direction (6).

11. Mounting device as in claim 1, wherein at least one undercut (24) is provided in the end section (9) for being fed through the mounting hole (3), for being engaged by a tool for pulling the mounting lug (1) into a final position in which it engages with the first edge area of the mounting hole (3), against an elastic force of a spring element (23) which is part of the at least one bearing-surface element.

12. Mounting device as in claim 1, wherein there are at least three mounting lugs, with support surfaces (12) of the at least three mounting lugs (1) lying in intersecting planes forming a triangular cylinder enclosing a geometrical center of the vehicle lamp.

13. Mounting device as in claim 1, wherein the mounting hole (3) of the vehicle is rectangular and a broader area (26) of the rectangular mounting hole (3) for receiving a portion of the end section (9) of the mounting lug (1) having the support surface (12) is broader than a narrower area (25) for receiving the spring mounted locking element (2).

14. Mounting device as in claim 1, wherein at least two of the spring mounted locking elements (2) are formed on the end section (9) of the mounting lug (1) for being inserted through the mounting hole (3) of the vehicle (4).

15. A mounting device for a vehicle lamp having:

at least one mounting lug (1) with a locking element (2) at its free end, the mounting lug (1) being located on a back of the lamp that has, at its free end, a locking element (2), said mounting lug (1) for being inserted into a mounting hole (3) of a vehicle (4) and fastened to a first edge area (5) of the mounting hole (3) in a self-locking manner;

said mounting device including at least one bearing-surface element for forming a first spring bearing surface (7, 23) of the lamp directed in an insertion direction (6) of the mounting lug (1) through the mounting hole (3) for being set against the vehicle (4) when the mounting lug is inserted into the mounting hole;

wherein the locking element (2) is formed on an end section (9) of the mounting lug (1) for being inserted through the mounting hole (3) of the vehicle (4) and for being spring mounted to move in an elastically flexible range relative to the rest of the lug at least about a pivot line (10) extending in the insertion direction (6);

wherein said locking element (2) has a first edge (17) extending to the pivot line (10) for engaging in a self-locking manner behind said first edge area (5) of the mounting hole (3) once the mounting lug is inserted into the mounting hole;

wherein the first edge (17) of the locking element (2), directed opposite the insertion direction (6), borders a slot (19) provided in the mounting lug (1), which runs crosswise to the insertion direction (6) and to the pivot line;

and wherein an eye-shaped opening (20) is provided in the mounting lug (1), adjacent to the spring mounted locking element (2) which opens into the slot (19).

16. Mounting device as in claim 15, wherein a wall thickness of the mounting lug (1) is greater at a section (21) at the eye-shaped opening (20).

17. A mounting device for a vehicle lamp having:

at least one mounting lug (1) with a locking element (2) at its free end, the mounting lug (1) being located on a back of the lamp that has, at its free end, a locking element (2), said mounting lug (1) for being inserted into a mounting hole (3) of a vehicle (4) and fastened to a first edge area (5) of the mounting hole (3) in a self-locking manner;

said mounting device including at least one bearing-surface element for forming a first spring bearing surface (7, 23) of the lamp directed in an insertion direction (6) of the mounting lug (1) through the mounting hole (3) for being set against the vehicle (4) when the mounting lug is inserted into the mounting hole;

wherein the locking element (2) is formed on an end section (9) of the mounting lug (1) for being inserted through the mounting hole (3) of the vehicle (4) and for being spring mounted to move in an elastically flexible range relative to the rest of the lug at least about a pivot line (10) extending in the insertion direction (6);

wherein said locking element (2) has a first edge (17) extending to the pivot line (10) for engaging in a self-locking manner behind said first edge area (5) of the mounting hole (3) once the mounting lug is inserted into the mounting hole;

and wherein at least one undercut (24) is provided in the end section (9) for being fed through the mounting hole (3), for being engaged by a tool for pulling the mounting lug (1) into a final position in which it engages with the first edge area of the mounting hole (3), against an elastic force of a spring element (23) which is part of the at least one bearing-surface element.

18. A mounting device for a vehicle lamp having:

at least one mounting lug (1) with a locking element (2) at its free end, the mounting lug (1) being located on a back of the lamp that has, at its free end, a locking element (2), said mounting lug (1) for being inserted into a mounting hole (3) of a vehicle (4) and fastened to a first edge area (5) of the mounting hole (3) in a self-locking manner;

said mounting device including at least one bearing-surface element for forming a first spring bearing surface (7, 23) of the lamp directed in an insertion direction (6) of the mounting lug (1) through the mounting hole (3) for being set against the vehicle (4) when the mounting lug is inserted into the mounting hole;

wherein the locking element (2) is formed on an end section (9) of the mounting lug (1) for being inserted through the mounting hole (3) of the vehicle (4) and for being spring mounted to move in an elastically flexible range relative to the rest of the lug at least about a pivot line (10) extending in the insertion direction (6);

wherein said locking element (2) has a first edge (17) extending to the pivot line (10) for engaging in a self-locking manner behind said first edge area (5) of the mounting hole (3) once the mounting lug is inserted into the mounting hole;

wherein the first edge (17) of the locking element (2), directed opposite the insertion direction (6), borders a slot (19) provided in the mounting lug (1), which runs crosswise to the insertion direction (6) and to the pivot line;

and wherein the bearing surface of the lamp that bears against the vehicle (4) is formed by a third edge (22) of the slot (19), directed in the insertion direction (6).

* * * * *